May 25, 1926.

A. J. STEPHENS

ENDLESS FLAP

Filed April 9, 1925

1,585,942

Inventor
A. J. Stephens
By C. A. Snow & Co.
Attorney

Patented May 25, 1926.

1,585,942

UNITED STATES PATENT OFFICE.

ANDREW J. STEPHENS, OF KANSAS CITY, MISSOURI.

ENDLESS FLAP.

Application filed April 9, 1925. Serial No. 21,953.

This invention aims to provide a flap adapted to be placed around the rim of a vehicle wheel to prevent the inner tube from coming into contact with the rim, and the invention aims to provide a flap of the class described which will be simple to manufacture and be well adapted to withstand severe use, the flap being so constructed that it will afford a cushion for the inner tube.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
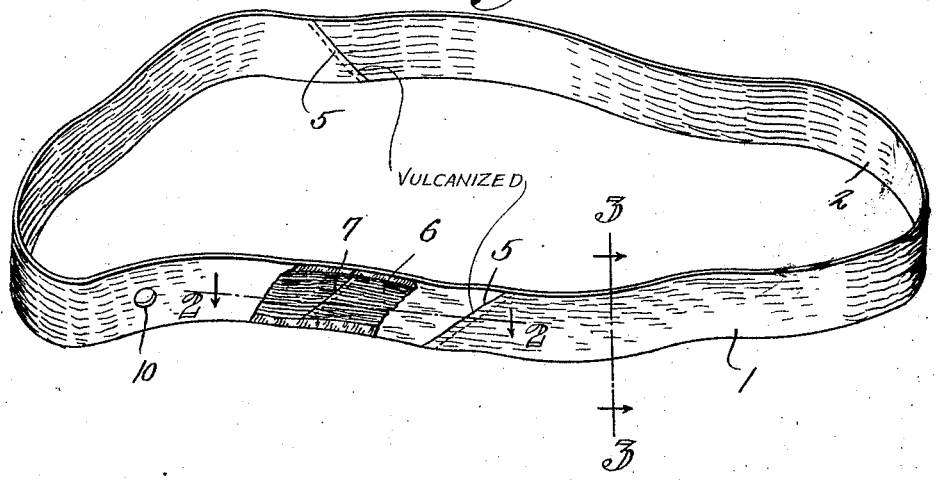
Figure 2:
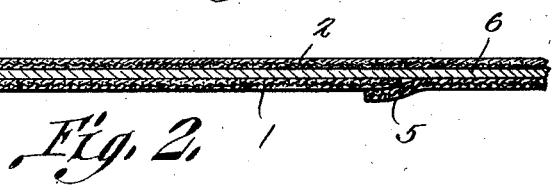
Figure 3:
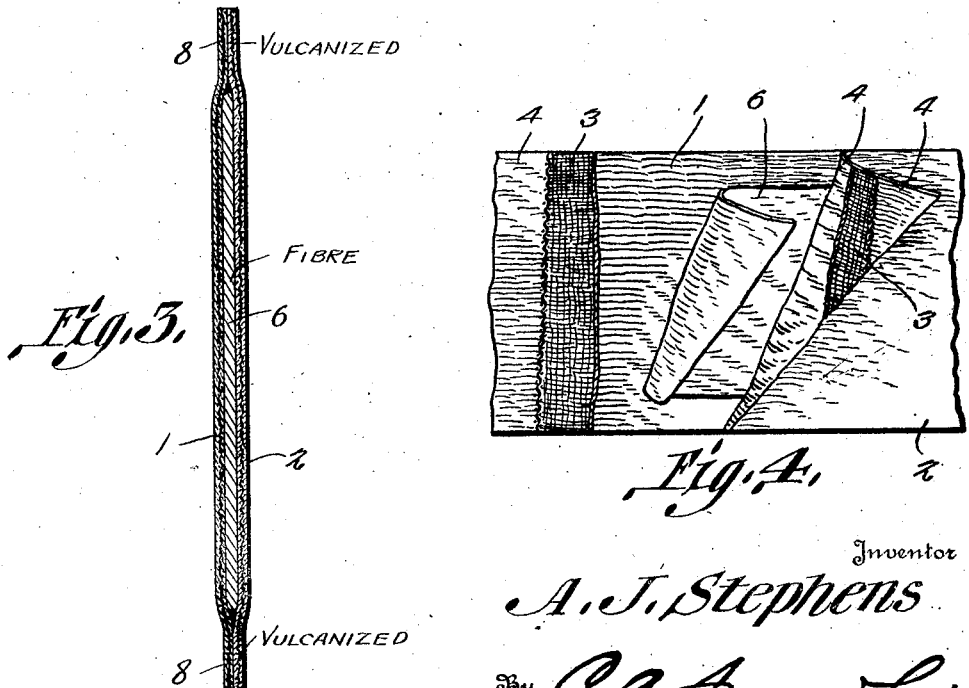
Figure 4:
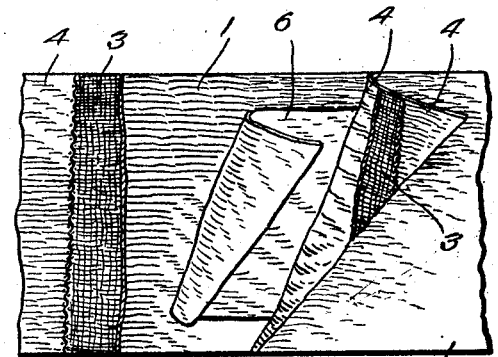

Figure 1 shows in perspective, a device constructed in accordance with the invention, parts being broken away; Figure 2 is a section on the line 2—2 of Figure 1; Figure 3 is a section on the line 3—3 of Figure 1; Figure 4 is a fragmental plan wherein parts are broken away.

The flap forming the subject matter of this application is adapted to be placed about a wheel rim, and comprises layers 1 and 2, each of which consists of a strip of fabric 3, cut on the bias, and made, generally of tire duck. Each of the strips 3 of fabric is coated on both sides with calendered rubber, as shown at 4. The ends of each of the layers 1 and 2 are overlapped as shown at 5, and are vulcanized together, the joints thus formed by the overlapped ends of the respective layers being spaced apart circumferentially of the flap. A band 6 of cushion material, preferably fibre compound, is disposed between the layers 1 and 2, and has its ends overlapped as at 7, the joint formed by the overlapped ends of the band 6 being disposed between the joints 5 of the layers 1 and 2, circumferentially of the flap. The band 6 is narrower than the layers 1 and 2, and the layers 1 and 2 are vulcanized together, as shown at 8, on each side of the band 6. The flap has the usual hole 10 for the reception of a valve stem. The band 6 of fibre compound serves as a cushion for the inner tube (not shown) and protects it from the metal rim of an automobile wheel. The flap is resilient enough so that it can be worked onto a rim, over the flanges of the rim, and after the flap is in place, it will retain its hold upon the rim.

Having thus described the invention, what is claimed is:—

A flap adapted to be placed about a wheel rim and comprising layers, each of which consists of a strip of fabric cut on the bias and coated on both sides with calendered rubber, the ends of each layer being overlapped and vulcanized together, and the joints formed by the overlapped ends of the respective layers being spaced apart circumferentially of the flap, a band of fibre compound disposed between the layers and having its ends overlapped, the joint formed by the overlapped ends of the band being disposed between the said joints of the layers, circumferentially of the flap, the band being narrower than the layers, and the layers being vulcanized together on each side of the band.

In testimony that I claim the foregoing as my own, I have hereto affixed my signature.

ANDREW J. STEPHENS.